(12) United States Patent
Li et al.

(10) Patent No.: US 8,767,675 B2
(45) Date of Patent: *Jul. 1, 2014

(54) METHOD, SYSTEM AND BASE STATION SUBSYSTEM FOR REALIZING HANDOVER IN LOCAL SWITCH

(75) Inventors: Jing Li, Shenzhen (CN); Xinhui Wang, Shenzhen (CH)

(73) Assignee: ZTE Corporation, Shenzhen (CN)

( * ) Notice: Subject to any disclaimer, the term of this patent is extended or adjusted under 35 U.S.C. 154(b) by 92 days.

This patent is subject to a terminal disclaimer.

(21) Appl. No.: 13/581,335

(22) PCT Filed: Apr. 15, 2011

(86) PCT No.: PCT/CN2011/072854
§ 371 (c)(1),
(2), (4) Date: Aug. 27, 2012

(87) PCT Pub. No.: WO2011/134352
PCT Pub. Date: Mar. 11, 2011

(65) Prior Publication Data
US 2012/0320877 A1 Dec. 20, 2012

(30) Foreign Application Priority Data
Apr. 30, 2010 (CN) .......................... 2010 1 0165412

(51) Int. Cl.
*G01R 31/08* (2006.01)
*H04W 36/02* (2009.01)
*H04W 8/08* (2009.01)

(52) U.S. Cl.
CPC .............. *H04W 36/02* (2013.01); *H04W 8/082* (2013.01)

USPC ........................... 370/331; 455/436; 455/445

(58) Field of Classification Search
CPC . H04W 36/0011; H04W 36/12; H04W 36/18; H04W 36/08; H04W 36/14
See application file for complete search history.

(56) References Cited

U.S. PATENT DOCUMENTS

2008/0310404 A1 12/2008 Valme et al.
2012/0270554 A1* 10/2012 Hellwig et al. ............... 455/445

FOREIGN PATENT DOCUMENTS

| CN | 101272626 A | 9/2008 |
| CN | 101374355 A | 2/2009 |
| CN | 101577948 A | 11/2009 |

OTHER PUBLICATIONS

International Search Report for PCT/CN2011/072854 mailed Jul. 21, 2011 (4 pages).

* cited by examiner

*Primary Examiner* — Kibrom T Hailu
(74) *Attorney, Agent, or Firm* — Sutherland Asbill & Brennan LLP

(57) ABSTRACT

A method for implementing a handover in a local switch, and the method comprises: when one party Mobile Station of a call implementing a local switch mode performs a Base Station Subsystem handover, the Base Station Subsystem handover transmits uplink speech data of the Mobile Station which does not need to perform the handover on a local switch link of the Base Station Subsystem and a link between the Base Station Subsystem and a Media Gateway simultaneously. A Base Station Subsystem implementing a handover in a local switch is also provided by the present invention.

13 Claims, 3 Drawing Sheets

METHOD, SYSTEM AND BASE STATION SUBSYSTEM FOR REALIZING HANDOVER IN LOCAL SWITCH

CROSS REFERENCE TO RELATED APPLICATIONS

This application claims the priority benefit of PCT/CN2011/072854 filed on Apr. 15, 2011 and Chinese Application No. 201010165412.2 filed on Apr. 30, 2010. The contents of these applications are hereby incorporated by reference in their entirety.

TECHNICAL FIELD

The present invention relates to the mobile communication field, and in particular, to a system, method and Base Station Subsystem for implementing a handover in a local switch.

BACKGROUND OF THE RELATED ART

In the existing Global System for Mobile Communications (referred to as GSM) system, both a Mobile Switching Center Server (referred to as MSC Server) and a Media Gateway (referred to as MGW) are integral parts of a Core Network (referred to as CN). A Base Station Subsystem (referred to as BSS) consists of a Base Station Controller (referred to as BSC) and a Base Transceiver Station (referred to as BTS). An interfaces through which the MSC Server and the MGW communicate with the BSC is called A interface, the BTS is connected with the BSC via an Abis interface, and the BTS communicates with a Mobile Station (referred to as MS) through an air interface of Um interface.

At present, in a calling and called process of the GSM system, a user-plane speech of a caller party is transferred to the Media Gateway via the BSS, and then is transferred to the BSS of an opposite party, even if the two parties of a call are in the same BSS. However, there are a large of number of Local Calls in an actual GSM network, that is, the two parties of the call belong to the same BSS, or belong to the different BTSs of the same BTS cluster, or belong to the same BSC. For the local calls, the following questions will appear if the current call handling process is followed.

For calls belonging to the same BTS, the following case that a user-plane speech of a caller party is transferred to the BSC via the Abis interface of the BTS, the BSC transfers the user-plane speech to the MGW via the A interface, the MGW transfers the user-plane speech to the original BSC via the A interface, and then the original BSC transfers the user-plane speech to the original BTS, will occur. The aforementioned transmission mode results in the waste of transmission resources between the Abis interface and the A interface.

For calls belonging to the different BTSs of the same BTS cluster, the following case that a user-plane speech of a caller party is transferred to the BTS controlled by the BTS cluster via the Abis interface of the BTS, the controlled BTS transfers the user-plane speech to the BSC via Abis interface of the BTS, the BSC transfers the user-plane speech to the MGW via the A interface, the MGW transfers the user-plane speech to the original BSC via the A interface, the original BSC transfers the user-plane speech to the above controlled BTS, and then the above controlled BTS transfers the user-plane speech to the original BTS, will occur. The aforementioned transmission mode results in the waste of transmission resources of the Abis interface between the above controlled BTS and the BSC, as well as the waste of transmission resources of the A interface.

For calls belonging to the same BSC, as shown in FIG. 1, the case that the BSC transfers a user-plane speech to the MGW via the A interface at first, and then the MGW transfers the user-plane speech to the BSC via the A interface, will occur, thus resulting in the waste of transmission resources of the A interface.

In order to avoid this type of the waste of the transmission resources, a local switch function is provided. The local switch function refers to a function of switching speech data of the two parties through BSS, and the switch of the user-plane speech of the two parties is performed by the BSC for the two parties of the call under the same BSS, just as shown in FIG. 2. However, if one party of the call needs to perform the handover after using the local switch, such as needing to perform the handover from the original BSS to another BSS, the two parties of the call are no longer provided with services by the same BSC, therefore the local switch function will no longer continue to be used.

When a call using the local switch function needs to be handed over, the method adopted by the existing scheme is to stop using the local switch at first, to restore the mode of switching through the core network, and then to hands over in accordance with the existing handover process, as shown in FIG. 3. However, the method requires releasing the local switch at first, and then executes the handover, thus deferring the time of handover. At the same time, the local switch is also required to be established again if the handover fails.

SUMMARY OF THE INVENTION

For the problem in the existing technology, the applicants provides a new idea, that is a local switch is not released when a Mobile Station is performing a handover; however, if the local switch is not released, and a handover function is directly adopted for users taking advantage of the local switch, and for one party not performing the handover, there are two user-plane links (an internal link of the local switch and a link connected with the MGW) simultaneously, while the handover source BSS cannot be informed of whether the MS performing the handover completes the handover or not as soon as possible. Therefore, the BSS does not know whether the uplink user-plane speech data received from the MS not performing the handover is required to be transmitted to the MS performing the handover via either the internal link of the local switch or the link connected with the MGW.

The technical problem to be solved by the present invention is to provide a system, method and Base Station Subsystem for implementing a handover in a local switch, thus efficiently avoiding the speech loss of the Mobile Station performing the handover during the handover, and maintaining the call between the two Mobile Stations well.

In order to address the aforementioned technical issue, the present invention provides a method for implementing a handover in a local switch, and the method comprises:

when one party Mobile Station of a call implementing a local switch mode performs a Base Station Subsystem handover, the Base Station Subsystem handover transmitting uplink speech data of the Mobile Station, which does not need to perform the handover, on a local switch link of the Base Station Subsystem and a link between the Base Station Subsystem and a Media Gateway simultaneously.

Wherein, the Base Station Subsystem transmits the uplink speech data of the Mobile Station, which does not need to perform the handover, on the local switch link of the Base Station Subsystem and the link between the Base Station Subsystem and the Media Gateway simultaneously, after receiving a handover command sent by a Mobile Switching Center Server.

The method further comprises:

after receiving a clear command sent by the Mobile Switching Center Server, the Base Station Subsystem releasing resources used by the Mobile Station performing the handover and releasing the local switch link, so as to stop transmitting the uplink speech data of the Mobile Station, which does not need to perform the handover, on the local switch link of the Base Station Subsystem.

Before the Base Station Subsystem transmits the uplink speech data of the Mobile Station, which does not need to perform the handover, on the local switch link of the Base Station Subsystem as well as the link between the Base Station Subsystem and the Media Gateway, the method further comprises:

during the handover, the Base Station Subsystem maintaining the local switch link, and establishing the link connected with the Media Gateway.

In order to solve the above technical problem, the present invention also provides a system for implementing a handover in a local switch, and the system comprises a Base Station Subsystem and a Mobile Station; wherein, the Base Station Subsystem is configured to transmit uplink speech data of the Mobile Station, which does not need to perform the handover, on a local switch link of the Base Station Subsystem as well as a link between the Base Station Subsystem and the Media Gateway, when one party Mobile Station of a call implementing a local switch mode performs the Base Station Subsystem handover.

The system further comprises a Mobile Switching Center Server;

the Mobile Switching Center Server is configured to transmit a handover command to the source Base Station Subsystem during the process that the Mobile Station is performing the handover from the source Base Station Subsystem to the destination Base Station Subsystem;

when being taken as the source Base Station Subsystem, the Base Station Subsystem is configured to transmit uplink speech data of the Mobile Station, which does not need to perform the handover, on the local switch link of the Base Station Subsystem as well as the link between the Base Station Subsystem and the Media Gateway after receiving the handover command sent by the Mobile Switching Center Server.

The system further comprises a Mobile Switching Center Server;

the Mobile Switching Center Server is configured to transmit a clear command to the source Base Station Subsystem when the Mobile Station completes the handover;

when being taken as the source Base Station Subsystem, the Base Station Subsystem is configured to, after receiving the clear command sent by the Mobile Switching Center Server, release resources used by the Mobile Station performing the handover as well as the local switch link, so as to stop transmitting the uplink speech data of the Mobile Station, which does not need to perform the handover, on the local switch link of the Base Station Subsystem.

In order to solve the above technical problem, the present invention also provides a Base Station Subsystem for implementing a handover in a local switch, and the Base Station Subsystem comprises a Base Station controller;

the Base Station controller is configured to transmit uplink speech data of a Mobile Station, which does not need to perform the handover, on a local switch link of the Base Station Subsystem as well as a link between the Base Station Subsystem and the Media Gateway, when one party Mobile Station of a call implementing a local switch mode performs the Base Station Subsystem handover.

Wherein, the Base Station Subsystem is configure to transmit the uplink speech data of the Mobile Station, which does not need to perform the handover, on the local switch link of the Base Station Subsystem and the link between the Base Station Subsystem and the Media Gateway simultaneously, after receiving a handover command sent by a Mobile Switching Center Server.

Wherein, the Base Station Subsystem is further configure to, after receiving the clear command sent by the Mobile Switching Center Server, release resources used by the Mobile Station performing the handover as well as the local switch link, so as to stop transmitting the uplink speech data of the Mobile Station, which does not need to perform the handover, on the local switch link of the Base Station Subsystem.

The mode provided in the present invention that uplink speech data of a Mobile Station, which does not need to perform the handover, is transmitted by a BSS on two links simultaneously, can efficiently avoid the speech loss of the Mobile Station performing the handover during the handover, and guarantees that the Mobile Station which needs to perform the handover can receive the speech data of the other party user no matter the Mobile Station is in the original BSS or the target BSS, thus maintaining the call between the two Mobile Stations efficiently.

PREFERRED EMBODIMENTS OF THE PRESENT INVENTION

Figure 1:
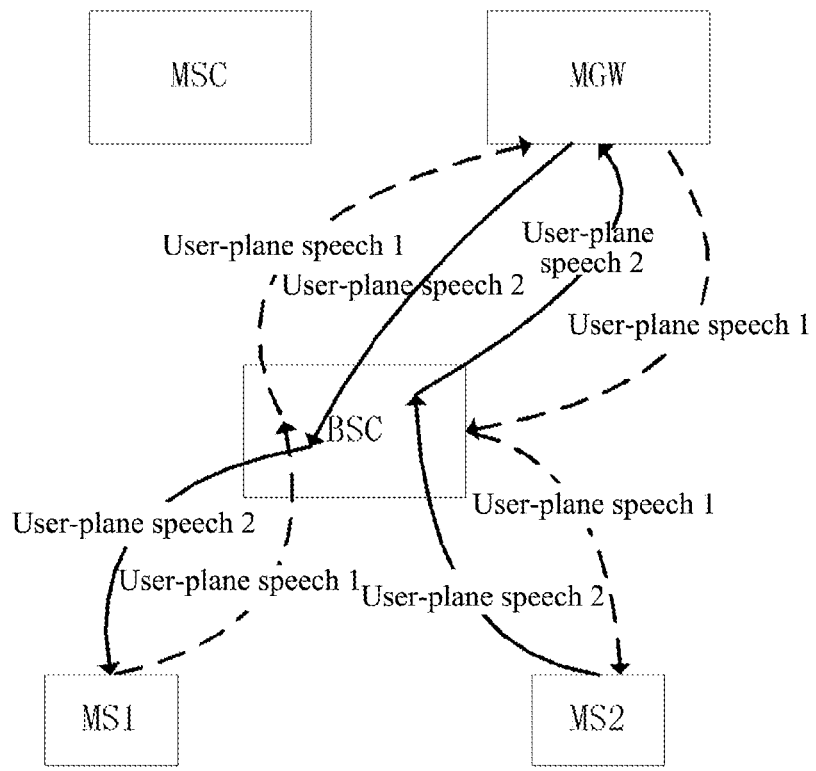
FIG. 1 is a diagram of a user-plane speech transmission between a MGW and two Mobile Stations which belong to the same BSC in the existing technology.

In order to make the purpose, technical scheme and advantages of the present invention more clearly understood, embodiments of the present invention will be illustrated in detail in combination with accompanying drawings hereinafter. It should be noted that the embodiments of the present invention and characteristics of the embodiments can be in any combination with each other without conflict.

A system for implementing a handover in a local switch in accordance with an embodiment of the present invention comprises a Mobile Station, a Base Station Subsystem and a Mobile Switching Center Server.

The Base Station Subsystem is configured to transmit uplink speech data of the Mobile Station, which does not need to perform the handover, on a local switch link of the Base Station Subsystem as well as a link between the Base Station Subsystem and the Media Gateway, when one party Mobile Station of a call implementing a local switch mode performs the Base Station Subsystem handover.

Wherein, performing the Base Station Subsystem handover refers to that the Mobile Station performs the handover from a Base Station Subsystem to another Base Station Subsystem. The BSS is composed of a BSC and a plurality of BTS, the case that the two parties of the call under the same BSS use the local switch in the present invention includes the following situations of: the two parties of the call belonging to the same BTS, the two parties of the call belonging to the different BTSs under the same BTS cluster, and the two parties of the call belonging to the same BSC. The handover performed by the Mobile Station in the present invention is a handover across Base Station Subsystems, also known as a handover across Base Station Subsystem controllers. The local switch link of the Base Station Subsystem refers to that two or more Mobile Stations establish a link of "Mobile Station-Base Station Subsystem-Mobile Station" to be used to complete the call by means of the local switch function of the Base Station Subsystem. The link between the Base Station Subsystem and the Media Gateway refers to a link established between the Base Station Subsystem and the MGW to realize the handover of the Mobile Station.

The Mobile Switching Center Server is configured to transmit a handover command to the source Base Station Subsystem during the process that the Mobile Station is performing the handover from the source Base Station Subsystem to the destination Base Station Subsystem; and to transmit a clear command to the source Base Station Subsystem when the Mobile Station completes the handover.

Specifically, when being taken as the source Base Station Subsystem, the Base Station Subsystem is configured to transmit uplink speech data of the Mobile Station, which does not need to perform the handover, on the local switch link of the Base Station Subsystem as well as the link between the Base Station Subsystem and the Media Gateway after receiving the handover command sent by the Mobile Switching Center Server; and to release resources used by the Mobile Station performing the handover as well as the local switch link, so as to stop transmitting the uplink speech data of the Mobile Station, which does not need to perform the handover, on the local switch link of the Base Station Subsystem, after receiving the clear command sent by the Mobile Switching Center Server.

The Base Station Subsystem comprises a Base Station controller as well as a base transceiver station, the Base Station controller accomplishes an operation and control function, and the base transceiver station is used to transmit message.

Figure 2:
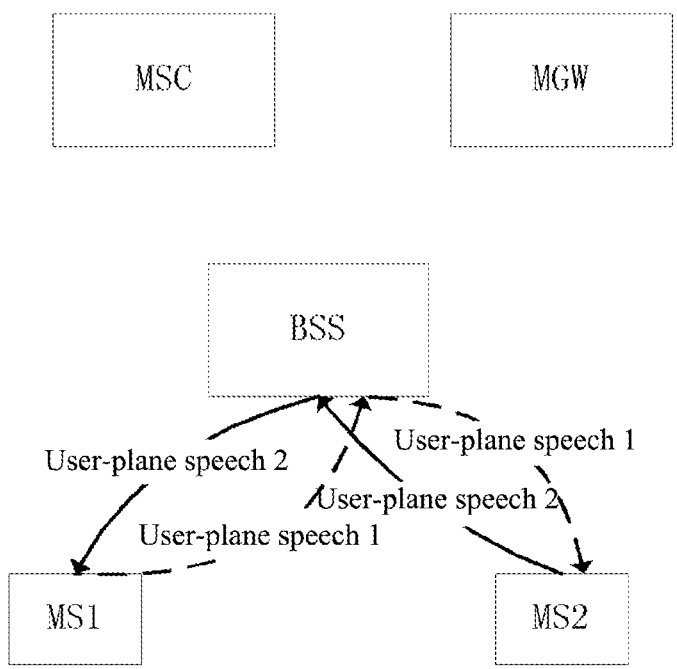
FIG. 2 is a diagram of a user-plane speech transmission among a MS, BSC and MGW in the case of setting a local switch in a BSS and after implementing a local switch, wherein speech data are not transmitted to a core network.
Figure 3:
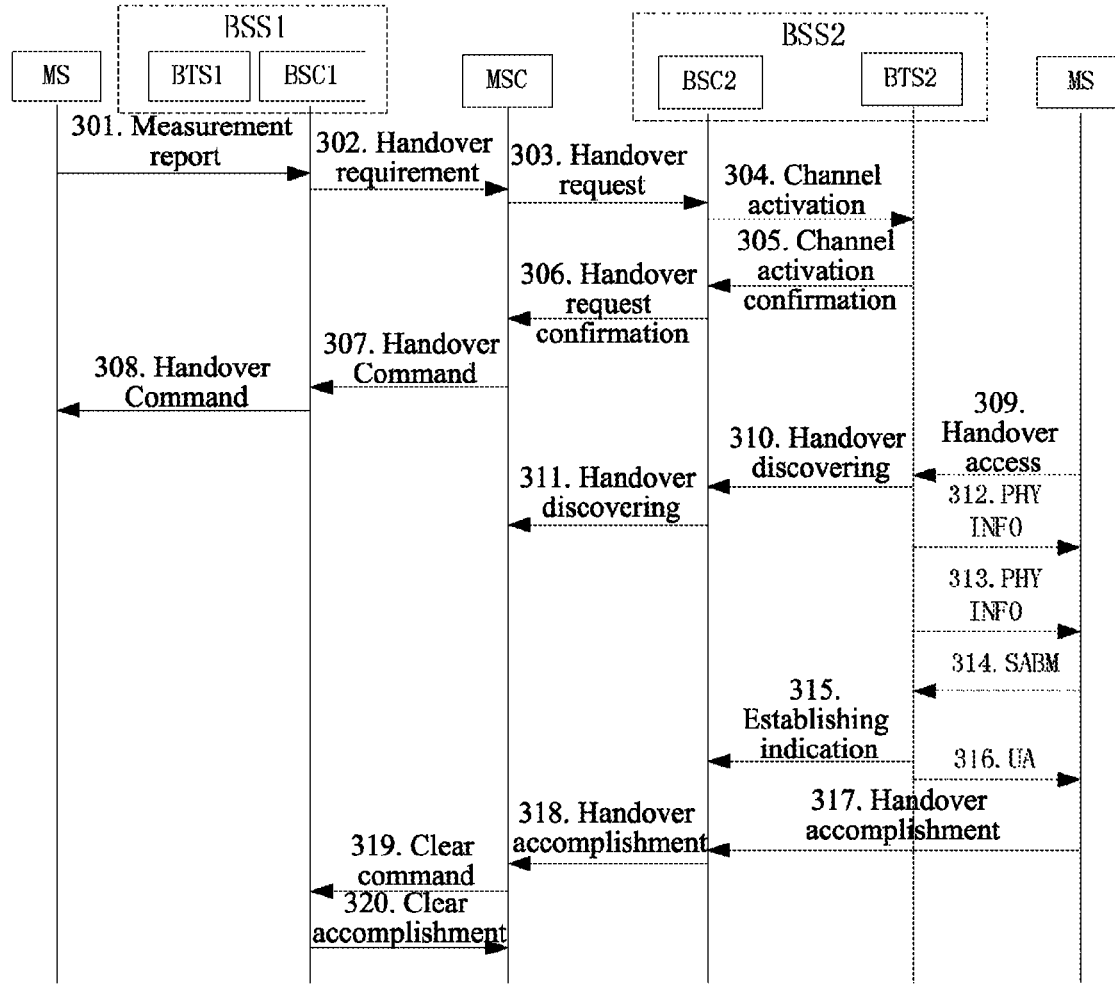
FIG. 3 is a flow chart of a handover process in the existing technology in the case that a local switch is set in a source BSS 1 and a Mobile Station is performing a BSS handover.

Before performing the handover, a Mobile Station adopts the local switch function in the source Base Station Subsystem to make a call with another Mobile Station (the mode as shown in FIG. 2). After handing over, the Mobile Station needs to execute a handover process (including a process as shown in FIG. 3) defined in the existing specification, to hand over to the destination Base Station Subsystem.

Figure 4:
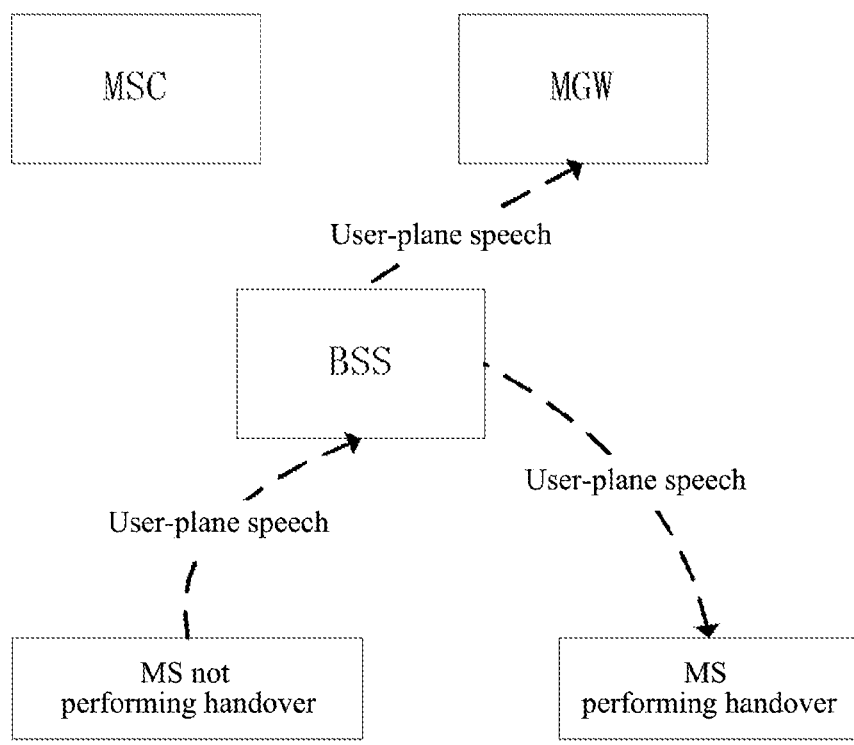
FIG. 4 is a flow chart of a method for implementing a handover in a local switch in accordance with an embodiment of the present invention.

As shown in FIG. 4, the method for implementing the handover in the local switch in the embodiment comprises: when one party Mobile Station of the call implementing the local switch mode performs the Base Station Subsystem handover, the Base Station Subsystem transmits uplink speech data of the Mobile Station, which does not need to perform the handover, on the local switch link of the Base Station Subsystem and the link between the Base Station Subsystem and the Media Gateway simultaneously.

During the process that the Mobile Station is performing the Base Station Subsystem handover, the Base Station Subsystem (that is the source Base Station Subsystem) transmits the uplink speech data of the Mobile Station, which does not need to perform the handover, on the local switch link of the Base Station Subsystem and the link between the Base Station Subsystem and the Media Gateway simultaneously, after receiving a handover command sent by the Mobile Switching Center Server. The Base Station Subsystem (i.e. the source Base Station Subsystem) releases resources used by the Mobile Station performing the handover as well as the local switch link, so as to stop transmitting the uplink speech data of the Mobile Station, which does not need to perform the handover, on the local switch link of the Base Station Subsystem, after receiving a clear command sent by the Mobile Switching Center Server.

In the present invention, during the process that the Mobile Station performs the handover, the Base Station Subsystem maintains the local switch link (that is the Base Station Subsystem does not releases the local switch link), and establishes the link connected with the Media Gateway, to make the BSS transmit the uplink speech data of the Mobile Station, which does not need to perform the handover, on the two links simultaneously, thus avoiding the speech loss of the handover Mobile Station efficiently during the handover, and guaranteeing that the Mobile Station which needs to perform the handover can receive the speech data of the other party user no matter the Mobile Station is in the original BSS or the target BSS, so as to maintain the call between the two Mobile Stations efficiently.

Those skilled in the technical field should understand that all or parts of steps of the aforementioned method can be completed by programs instructing the corresponding hardware, and the programs might be stored in a computer readable storage medium, such as a read-only memory, a disk, or a CD-ROM and so on. Alternatively, all or parts of steps of the aforementioned embodiments can be implemented with one or more integrated circuits. Correspondingly, each module or unit can be implemented in the form of hardware, as well as software functional modules. The present invention is not limited to any specific combinations of hardware and software.

Of course, the present invention further comprises a plurality of other embodiments; those skilled in the field should make various corresponding modifications and variations according to the present invention, without departing from the spirit and concept of the present invention, however, all the corresponding modifications and variations should belong to the protection scope of accompanying claims of the present invention.

INDUSTRIAL APPLICABILITY

By the means provided in the present invention that uplink speech data of a Mobile Station, which does not need to perform a handover, is transmitted by a BSS on two links, the speech loss of the handover Mobile Station during the handover can be efficiently avoided, and it is guaranteed that the Mobile Station which needs to perform the handover can receive the speech data of the other party user no matter the Mobile Station is in the original BSS or the target BSS, thus maintaining the call between the two Mobile Stations efficiently.

What is claimed is:

1. A method for implementing a handover in a local switch, and the method comprises:
   when one party of two Mobile Stations of a call implementing in a local switch mode performs a Base Station Subsystem handover and another party of the two Mobile Stations does not need to perform the Base Station Subsystem handover, the Base Station Subsystem transmitting uplink speech data of said another party of the two Mobile Stations on a local switch link of the Base Station Subsystem and a link between the Base Station Subsystem and a Media Gateway simultaneously.

2. The method of claim 1, wherein:
the Base Station Subsystem transmits the uplink speech data of said another party of the two Mobile Stations on the local switch link of the Base Station Subsystem and the link between the Base Station Subsystem and the Media Gateway simultaneously, after receiving a handover command sent by a Mobile Switching Center Server.

3. The method of claim 2, further comprising:
after receiving a clear command sent by the Mobile Switching Center Server, the Base Station Subsystem releasing resources used by said one party of the two Mobile Stations and releasing the local switch link, stopping transmitting the uplink speech data of said another party of the two Mobile Stations on the local switch link of the Base Station Subsystem.

4. The method of claim 1, before the Base Station Subsystem transmitting the uplink speech data of said another party of the two Mobile Stations on the local switch link of the Base Station Subsystem and the link between the Base Station Subsystem and the Media Gateway simultaneously, further comprising:
during the handover, the Base Station Subsystem maintaining the local switch link, and establishing the link connected with the Media Gateway.

5. A system for implementing a handover in a local switch, comprising a Base Station Subsystem and two Mobile Stations; wherein,
the Base Station Subsystem is configured to, when one party of the two Mobile Stations of a call implementing in a local switch mode performs a Base Station Subsystem handover and another party of the two Mobile Stations does not need to perform the Base Station Subsystem handover, transmit uplink speech data of said another party of the two Mobile Stations on a local switch link of the Base Station Subsystem and a link between the Base Station Subsystem and the Media Gateway simultaneously.

6. The system of claim 5, further comprising a Mobile Switching Center Server; wherein,
the Mobile Switching Center Server is configured: to transmit a handover command to a source Base Station Subsystem during a process in which said one party of the two Mobile Stations is performing the handover from the source Base Station Subsystem to a destination Base Station Subsystem;
when being taken as the source Base Station Subsystem, the Base Station Subsystem is configured to transmit uplink speech data of said another party of the two Mobile Stations on the local switch link of the Base Station Subsystem and the link between the Base Station Subsystem and the Media Gateway simultaneously after receiving the handover command sent by the Mobile Switching Center Server.

7. The system of claim 5, further comprising a Mobile Switching Center Server; wherein,
the Mobile Switching Center Server is configured to transmit a clear command to the source Base Station Subsystem when said one party of the two Mobile Stations completes the handover;
when being taken as the source Base Station Subsystem, the Base Station Subsystem is configured to, after receiving a clear command sent by the Mobile Switching Center Server, release resources used by said one party of the two Mobile Stations release the local switch link, stop transmitting the uplink speech data of said another party of the two Mobile Stations on the local switch link of the Base Station Subsystem.

8. A Base Station Subsystem for implementing a handover in a local switch, comprising a Base Station controller;
the Base Station controller is configured: to, when one party of two Mobile Stations of a call implementing in a local switch mode performs a Base Station Subsystem handover and another party of the two Mobile Stations does not need to perform the Base Station Subsystem handover, transmit uplink speech data of said another party of the two Mobile Stations on a local switch link of the Base Station Subsystem and a link between the Base Station Subsystem and a Media Gateway simultaneously.

9. The Base Station Subsystem of claim 8, wherein,
the Base Station Subsystem is configured to, after receiving a handover command sent by a Mobile Switching Center Server, transmit the uplink speech data of said another party of the two Mobile Stations on the local switch link of the Base Station Subsystem and the link between the Base Station Subsystem and the Media Gateway simultaneously, after receiving a handover command sent by a Mobile Switching Center Server.

10. The Base Station Subsystem of claim 8, wherein,
the Base Station Subsystem is further configured to, after receiving a clear command sent by the Mobile Switching Center Server, release resources used by said one party of the two Mobile Stations, release the local switch link, stop transmitting the uplink speech data of said another party of the two Mobile Stations on the local switch link of the Base Station Subsystem.

11. The method of claim 2, before the Base Station Subsystem transmitting the uplink speech data of said another party of the two Mobile Stations on the local switch link of the Base Station Subsystem and the link between the Base Station Subsystem and the Media Gateway simultaneously, further comprising:
during the handover, the Base Station Subsystem maintaining the local switch link, and establishing the link connected with the Media Gateway.

12. The method of claim 3, before the Base Station Subsystem transmitting the uplink speech data of said another party of the two Mobile Stations on the local switch link of the Base Station Subsystem and the link between the Base Station Subsystem and the Media Gateway simultaneously, further comprising:
during the handover, the Base Station Subsystem maintaining the local switch link, and establishing the link connected with the Media Gateway.

13. The Base Station Subsystem of claim 9, wherein,
the Base Station Subsystem is further configured to, after receiving a clear command sent by the Mobile Switching Center Server, release resources used by said one party of the two Mobile Stations, release the local switch link, stop transmitting the uplink speech data of said another party of the two Mobile Stations on the local switch link of the Base Station Subsystem.

* * * * *